United States Patent [19]
Cox

[11] Patent Number: 5,495,473
[45] Date of Patent: Feb. 27, 1996

[54] METHOD AND APPARATUS FOR IMPLEMENTING HARDWARE INDEPENDENT ECHO CANCELLATION IN A FULL-DUPLEX AUDIO STREAM IN A COMPUTER SYSTEM

[75] Inventor: Daniel R. Cox, Portland, Oreg.

[73] Assignee: Intel Corporation, Santa Clara, Calif.

[21] Appl. No.: 364,692

[22] Filed: Dec. 28, 1994

[51] Int. Cl.⁶ .................................................. H04B 3/20
[52] U.S. Cl. ........................................ 370/32.1; 379/410
[58] Field of Search .............................. 370/32.1, 32, 24, 370/29, 30, 31; 379/388, 389, 390, 406, 407, 408, 409, 410, 411, 420, 392; 348/534, 404, 405, 406; 375/209, 210, 208, 222, 229, 232

[56] References Cited

U.S. PATENT DOCUMENTS

| | | | |
|---|---|---|---|
| 5,193,112 | 3/1993 | Sano | 370/32.1 |
| 5,278,872 | 1/1994 | Greenberg | 370/32.1 |
| 5,371,789 | 12/1994 | Hirano | 370/32.1 |
| 5,390,250 | 2/1995 | Janse et al. | 370/32.1 |

*Primary Examiner*—Douglas W. Olms
*Assistant Examiner*—Dang Ton
*Attorney, Agent, or Firm*—Blakely, Sokoloff, Taylor & Zafman

[57] ABSTRACT

A method and apparatus for implementing the removal of electronic or acoustic echo from a full-duplex audio data stream. Audio data which has been input into a processing system is sampled at a predetermined rate. Audio data which has been received by the processing system and which is to be output from the processing system is also sampled. Each sample of the output audio data corresponds in time to the most recent sample of the input audio data and approximates the value of the output audio data at the time the most recent sample of the input audio data was acquired. A storage device is provided for storing N samples of the input audio data and N corresponding samples of the output audio data, where N is a positive integer. N samples of the input audio data and N corresponding samples of the output audio data are stored in the storage device, such that the contents of the storage device represent both the input audio data and an approximation of corresponding output audio data during a given time interval. This combined input/output can be routed through the processing system or across a communications network to another processing system, and the echo can be ignored or removed at any point by a cancellation device.

15 Claims, 5 Drawing Sheets

METHOD AND APPARATUS FOR IMPLEMENTING HARDWARE INDEPENDENT ECHO CANCELLATION IN A FULL-DUPLEX AUDIO STREAM IN A COMPUTER SYSTEM

FIELD OF THE INVENTION

The present invention pertains to the field of audio communications between computer systems. More particularly, the present invention relates to echo cancellation in a full-duplex audio data stream in a computer system.

BACKGROUND OF THE INVENTION

Many modern communication systems, such as telephone systems and real-time digital multi-media computer systems, use full-duplex audio transmission. In full-duplex transmission, communication takes place simultaneously in both directions between a sender and a receiver. One problem with certain full-duplex communication systems, however, is that they can be susceptible to echoes. Echoes are created when audio data traveling in one direction is inadvertently combined with audio data traveling in the other direction, causing the sender of a message to hear part or all of his own message in the return transmission. Echoes may be acoustic, when sound coming from a speaker is transferred to the microphone, or they may be electromagnetic, when audio data is reflected at the receiving end of a transmission line back to the sender.

In order to function effectively, communication systems using full-duplex transmission usually provide some means of canceling or reducing echoes. In telephone systems, echo cancellation is normally provided within the telephone network. However, in real-time digital multi-media systems using compressed digital audio, the network echo cancellor may be bypassed and therefore may be unable to remove echoes. Because echoes become encoded within the digital data in such systems, echo cancellation generally requires digital sequences which represent both the input and the output at the time the input was acquired. Furthermore, it may be desirable to have a high degree of correlation between that input and output. Typically, however, the input and output streams are processed as half-duplex entities and are routed through the system using different paths. Consequently, diverse delays between input and output streams can be produced, making resynchronization difficult. Moreover, to incorporate an echo cancellation algorithm into a device driver would introduce complexity where it is neither practical nor desirable.

Because of these problems, certain multi-media applications require that an echo cancellor be integrated into the desktop system in order to support speakerphone audio in point-to-point or multipoint settings. Further, because of the problem of correlating the input and output signals, echo cancellation can become difficult if echoes are not removed at a point which is electrically very close to the input/output (I/O) devices, e.g., the speaker and the microphone. FIG. 2 illustrates one prior art implementation for performing echo cancellation in an existing multi-media application..

SUMMARY OF THE INVENTION

The present invention pertains to a method and apparatus for implementing the removal of an echo from a full-duplex audio data stream in a first processing system which uses full-duplex audio communication with a second processing system.

In the claimed method, analog audio data which has been input into the first computer system is sampled at a predetermined rate. Audio data which has been received by the first processing system from the second processing system and which is to be output from the first processing system is also provided. Each outgoing sample of the output audio data corresponds in time to the most recent incoming sample of the input audio data and approximates the value of the output audio data at the time the most recent sample of the input audio data was acquired. A storage device is provided for storing N samples of the input audio data and N corresponding samples of the output audio data, where N is a positive integer. Then, N samples of the input audio data and N corresponding samples of the output audio data are stored in the storage device, such that the contents of the storage device represent both the input audio data and an approximation of corresponding output audio data during a given time interval.

Also described is the above method further comprising the steps of: providing the contents of the storage device to an echo cancellation device; identifying the echo based on the contents of the storage device; and removing the echo to generate an echo-free approximation of the input audio data.

Other features of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In view of the above problems with certain existing multi-media systems using full-duplex audio, it is desirable to simplify the task of echo cancellation in such systems. In particular, it is desirable to simplify the role of the device driver by removing the need to perform echo cancellation within the driver. It is also desirable to simplify the task of providing correlated input and output to the echo cancellor. Further, it is desirable to reduce dependency on specific hardware in performing echo cancellation, thereby simplifying the echo cancellation algorithm. In addition, it also desirable to facilitate echo cancellation in a manner which still permits high correlation between input and output samples to be achieved, thus reducing the required delay line lengths.

A method and apparatus for facilitating the removal of electronic or acoustic echo from a full-duplex audio data stream in a computer system are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
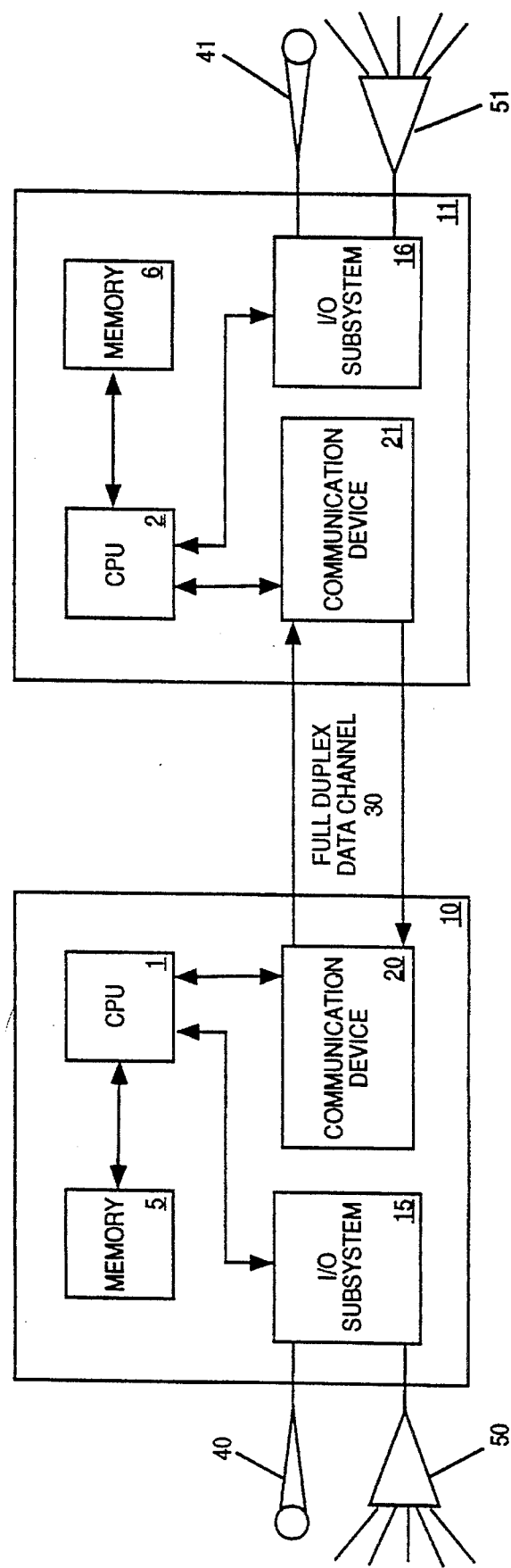
FIG. 1 shows block diagram of two computer systems which communicate with each other using full-duplex audio data transfer.

An embodiment of present invention may be implemented in a computer system which is linked with one or more other computer systems by a full-duplex audio data channel. FIG. 1 shows one such communication link between two computer systems 10 and 11. Computer systems 10 and 11 comprise I/O subsystems 15 and 16, respectively, in which echo cancellation may be performed in accordance with the present invention. In addition, each of the computer systems 10 and 11 comprises a central processing unit 1 and 2 coupled to the I/O subsystem 15 and 16, to a communication device 20 and 21, and to a memory 5 and 6, respectively. The computer systems 10 and 11 are linked together through their respective communication devices 20 and 21 by a full-duplex audio data channel 30. Sound is input into the I/O subsystems 15 and 16 of each computer system 10 and 11 through microphones 40 and 41. The I/O subsystems 15 and 16 also drive speakers 50 and 51, which generate sound.

Figure 3:
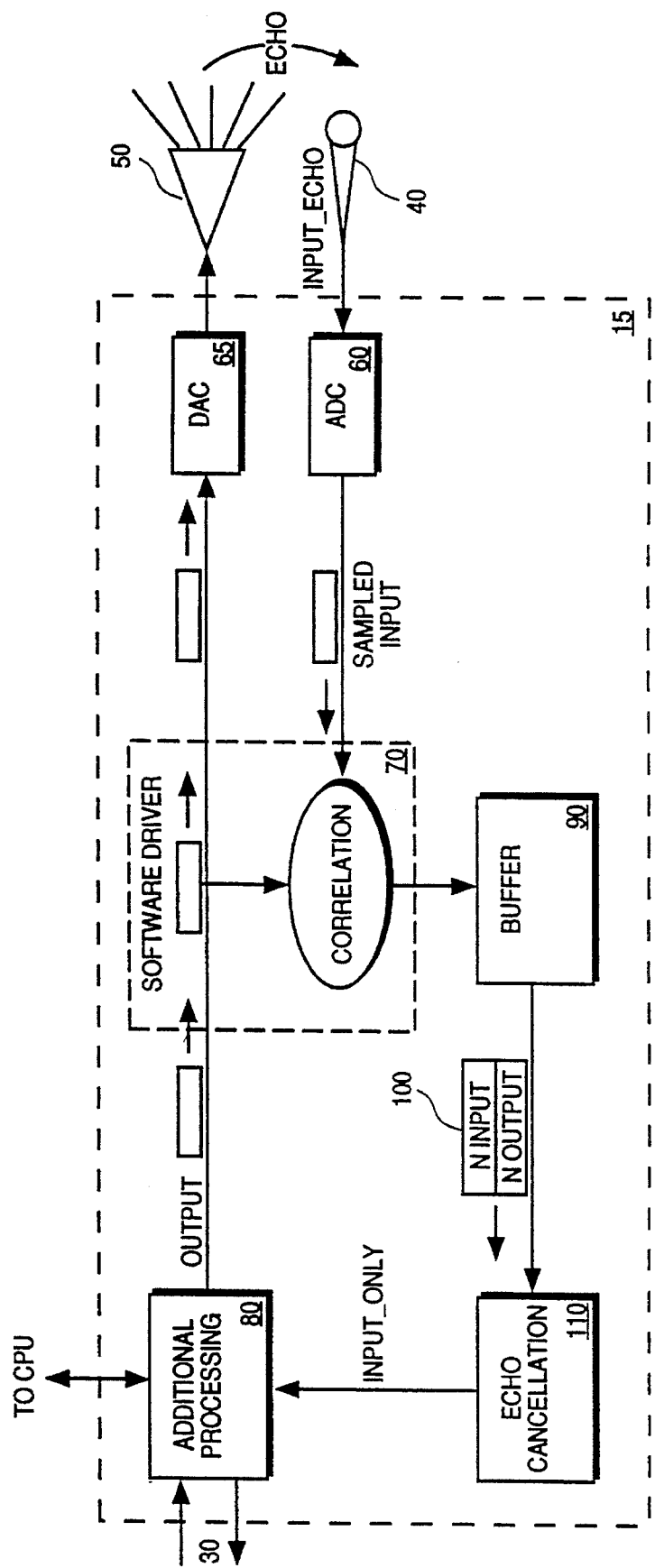
FIG. 3 shows a block diagram of an apparatus for performing echo cancellation.

FIG. 3 illustrates the I/O subsystem 15 in more detail. Sound waves are input into the microphone 40 where they are converted into an electrical signal INPUT_ECHO. The sound waves may include an acoustic echo ECHO of sound recently generated from the speaker 50. The electrical signal INPUT_ECHO is input to an analog-to-digital converter (ADC) 60, which generates digital samples of the input signal INPUT_ECHO based on a predetermined sample rate. A digital-to-analog converter (DAC) 65 receives from other hardware 80 within the I/O subsystem 20 an output signal OUTPUT carrying digital samples of audio data received from another computer system 11. The output of the ADC 60 drives the speaker 50. The ADC 60 and the DAC 65 are both common, off-the-shelf devices which are well known to those skilled in the art. The other hardware 80 interfaces the I/O subsystem 15 with the CPU 1 and the data channel 30. The details of the other hardware 80 are not relevant for purposes of this description.

The software driver 70 controls sampling of the input signal INPUT_ECHO so that the samples in output signal OUTPUT are correlated in time with the samples of the input signal INPUT_ECHO. The precise degree of correlation between the input samples and output samples is dependent upon the particular hardware used to implement the ADC 60 and the DAC 65 and is not critical to practicing the present invention. However, as the degree of correlation between the input samples and the output samples is increased, the efficiency of echo cancellation which is achievable also increases. Echo cancellation is facilitated by providing a buffer 90 for storing both input samples and the corresponding output samples. Storage of input samples and corresponding output samples in the buffer 90 is controlled by the software driver 70. The buffer outputs a data packet 100 which is defined to have a total size of N samples, comprising N/2 input samples and N/2 corresponding output samples. The data packet 100 is provided to an echo cancellation device 110, which may be embodied in hardware, software, or both. The echo cancellation device 110 then generates a signal INPUT_ONLY which represents sound input into the microphone 40 without an echo.

Figure 2:
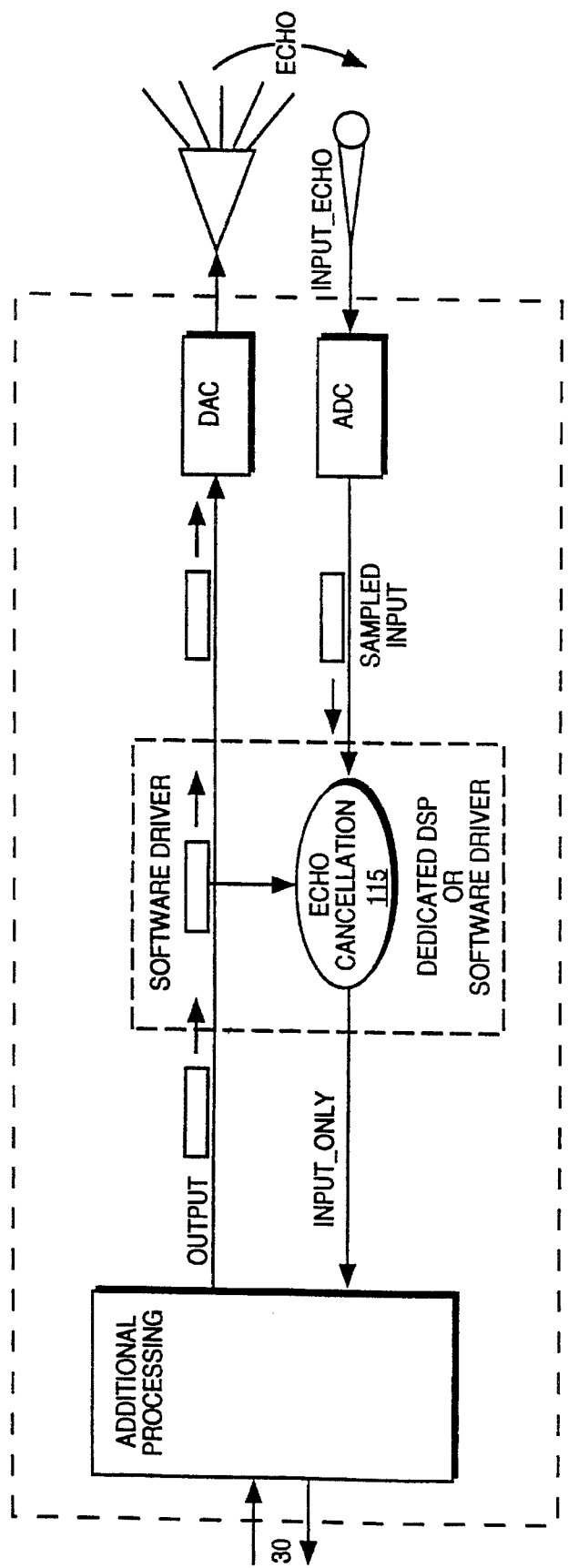
FIG. 2 shows one prior art implementation for performing echo cancellation.
Figure 5:
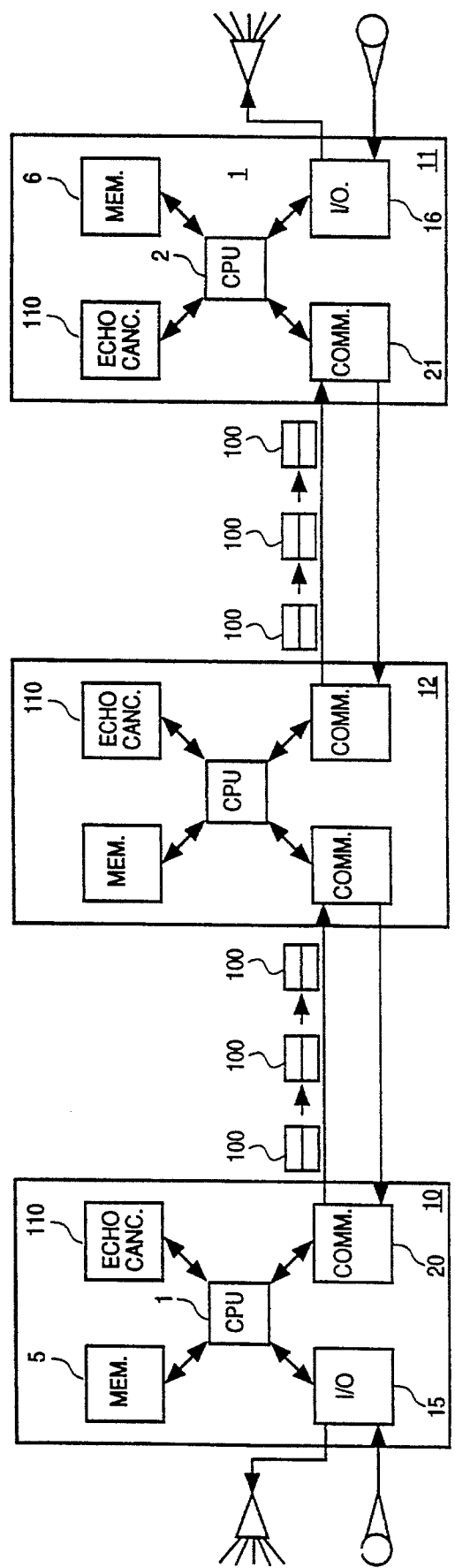
FIG. 5 shows alternatives for performing the echo cancellation function outside of a device driver.

In contrast with the prior art depicted in FIG. 2, there is no need to remove echo at the I/O device level. Echo cancellation may be performed at any stage within the I/O subsystem 20 or, as illustrated in FIG. 5, the data packet 100 may be transmitted onto the data channel 30 such that echo cancellation may be performed in the receiving computer system 11 or in an intermediate system 12. In addition, the data packet 100 may be provided to various other components of computer system 10 or 11 or intermediate system 12 for purposes other than echo cancellation, if desired.

Figure 4:
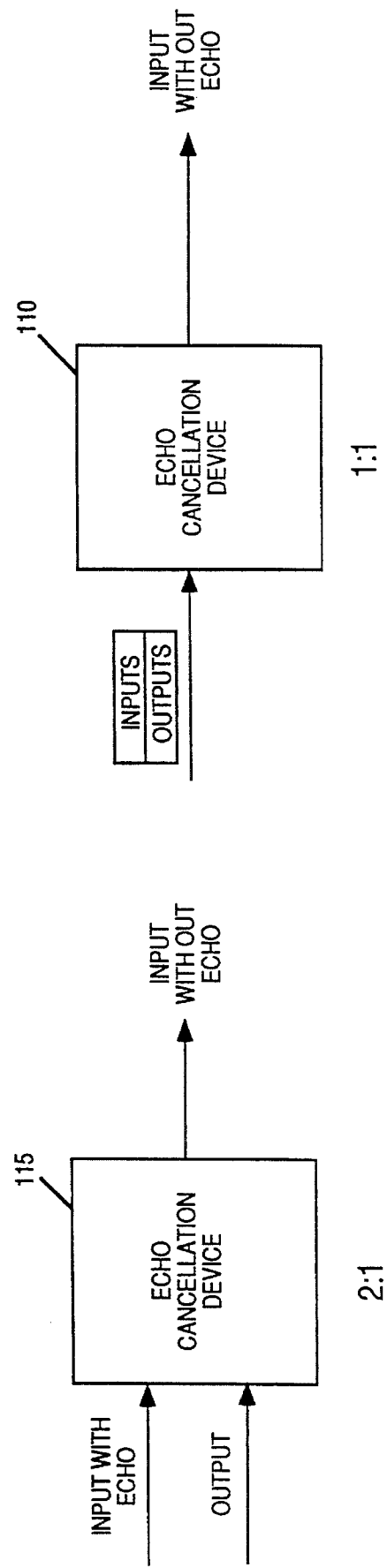
FIGS. 4a and 4b show a comparison of signal transformations resulting from echo cancellation.

The echo cancellation device 110, whether it is embodied in hardware or software, is defined to have the same characteristics as a generic filter which performs a one-to-one transformation upon the input. Each packet of output data from the echo cancellation device 110 requires only a single data packet 100 as input. This is in contrast with the typical prior art echo cancellation device 115 in FIG. 2, which performs a two-to-one transformation. The prior art echo cancellation device 115 receives both input audio data having an echo and output audio data in order to generate echo-free input audio data. FIG. 4a depicts the signal transformations for echo cancellation in accordance with the prior art implementation of FIG. 2. In contrast FIG. 4b depicts the signal transformations for echo cancellation performed in accordance with the present invention.

The data packet 100 may be implemented to mimic stereo audio data. For example, the portion of the data packet 100 which the computer system 10 interprets as the left channel may be used for storing input samples, while the portion of the data packet 100 which the system 10 interprets as the right channel is used for storing the corresponding output samples. The channel containing the output samples may be used for echo cancellation, for other purposes, or it may be ignored.

Hence, the task of echo cancellation is simplified. In particular, the role of the device driver is simplified by removing the need to perform echo cancellation within the driver. In addition, dependency on specific hardware in performing echo cancellation is reduced, thereby simplifying the echo cancellation algorithm. Also, the task of providing correlated input and output to the echo cancellor is simplified. Further, echo cancellation may be performed in a manner which still permits high correlation between input and output samples to be achieved, thus helping to reduce the required delay line lengths. In addition, the actual echo cancellation function can be performed anywhere between the input point in a transmitting computer system and the output point in a receiving computer system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of implementing removal of an echo from a full-duplex audio data stream, comprising the steps of:

sampling at a predetermined rate input audio data which has been input into a first processing system for transmitting to a second processing system to produce a plurality of samples of the input audio data, the first processing system using the full-duplex audio data stream to communicate with the second processing system;

providing a plurality of samples of output audio data which has been received by the first processing system from the second processing system and which is to be output by the first processing system;

correlating the samples of the input audio data with the samples of the output audio data such that each sample of the output audio data corresponds in time to the most recent sample of the input audio data and approximates the value of the output audio data at the time the most recent sample of the input audio data was acquired; and storing in a storage device a plurality of correlated samples of the input audio data and the output audio data, such that the contents of the storage device represent both the input audio data and an approximation of corresponding output audio data during a given time interval.

2. The method set forth in claim 1, further comprising the step of providing contents of the storage device to an echo cancellation device.

3. The method set forth in claim 2, further comprising the steps of:

identifying the echo based on the contents of the storage device; and removing the echo to generate an echo-free approximation of the input audio data.

4. The method set forth in claim 1, wherein the echo is electromagnetically induced.

5. The method of claim 1, wherein the storing step comprises the step of storing one sample of the output audio data for each stored sample of the input audio data.

6. An apparatus for facilitating removal of an echo from a full-duplex audio data stream, the apparatus comprising:

input circuitry sampling at a predetermined rate input audio data which has been input into a first communication device for transmitting to a second communication device to generate a plurality of samples of the input audio data, the first communication device communicating with the second communication device using the full-duplex audio data stream;

output circuitry providing a plurality of samples of output audio data which has been received or stored by the first communication device and is to be output from the first communication device, one sample of the output audio data for each sample of the input audio data, correlation logic coupled to received the samples of the input audio data and the samples of the output audio data, the correlation logic correlating the samples of the input audio data with the samples of the output audio data such that each sample of the output audio data corresponds in time to the most recent sample of the input audio data and approximates the value of the output audio data at the time the most recent sample of the input audio data was acquired; and a buffer coupled to receive and store a plurality of correlated samples of the input audio data and the output audio data, such that each stored sample of the output audio data corresponds to a particular stored sample of the input audio data.

7. The apparatus set forth in claim 6, further comprising an echo cancellation device for receiving contents of the memory, the echo cancellation device for identifying an electronic or acoustic echo of the output audio data in the input audio data based on contents of the memory and for removing the echo to generate an echo-free approximation of the input audio data.

8. The apparatus set forth in claim 6, wherein the echo is electromagnetically induced.

9. The apparatus of claim 6, wherein the buffer stores one sample of the output audio data for each stored sample of the input audio data.

10. An apparatus for implementing removal of an echo from a full-duplex audio stream, the apparatus comprising:

means for sampling at a predetermined rate input audio data which has been input into a first communication device for transmitting to a second communication device, the first communication device communicating with the second communication device using the full-duplex audio stream;

means for providing samples of output audio data which has been received by the first communication device and is to be output from the first communication device, such that the output audio data is sampled once for each time the input data is sampled;

means for correlating the samples of the input audio data with the samples of the output audio data such that each sample of the output audio data corresponds in time to the most recent sample of the input audio data and approximates the value of the output audio data at the time the most recent sample of the input audio data was acquired; and storage means for storing N samples of the input audio data and N corresponding samples of the output audio data, where N is a positive integer, such that each stored sample of the output audio data corresponds to a particular stored sample of the input audio data.

11. The apparatus set forth in claim 10, further comprising echo cancellation means for receiving contents of the storage means, the echo cancellation means further for identifying the echo based on contents of the storing means and for removing the echo to generate an echo-free approximation of the input audio data.

12. The apparatus set forth in claim 10, wherein the echo is electromagnetically induced.

13. A first processing system having full-duplex audio communication with a second processing system, the first processing system comprising:

a processor controlling operation of the processing system;

a communication device coupled to the processor, the communication device processing full-duplex audio data, the communication device including:

input circuitry coupled to receive acoustic signals and to convert the acoustic signals to audio data;

output circuitry coupled to receive audio data and to convert the audio data to acoustic signals;

transmit/receive circuitry coupled to transmit or receive audio data; and sampling circuitry coupled to receive and sample at a predetermined rate input audio data to be transmitted to the second processing system;

logic coupled to provide a plurality of samples of output audio data received or stored by the first processing system, one sample of the output audio data for each sample of the input audio data; and correlation logic coupled to receive samples of the input audio data and samples of the output audio data, the correlation logic correlating the samples of the input audio data with the samples of the output audio data such that each sample of the output audio data corresponds in time to the most recent sample of the input audio data and approximates the value of the output audio data at the time the most recent sample of the input audio data was acquired; and a buffer coupled to receive and store N samples of the input audio data and N corresponding samples of the output audio data, such that each stored sample of the output audio data corresponds to a particular stored sample of the input audio data; and an echo cancellor coupled to receive the contents of the buffer, the echo cancellor identifying an echo of the output audio data in the input audio data based on the contents of the buffer and removing the echo to generate an echo-free approximation of the input audio data.

14. A processing system having full-duplex audio communication with another processing system, comprising:

processor means for controlling operation of the processing system;

communication means for processing full-duplex audio data, the communication means including:
means for converting acoustic signals to audio data;
means for converting audio data to acoustic signals;
means for transmitting the audio data;
means for sampling at a predetermined rate input audio data to be transmitted;
means for providing a plurality of samples of output audio data; and correlation means for receiving the samples of the input audio data and the samples of the output audio data, the correlation means further for correlating the samples of the input audio data with the samples of the output audio data such that each sample of the output audio data corresponds in time to the most recent sample of the input audio data and approximates the value of the output audio data at the time the most recent sample of the input audio data was acquired; and storage means for receiving and storing a plurality of correlated samples of the input audio data and the output audio data such that each stored sample of the output audio data corresponds to a particular stored sample of the input audio data.

15. The apparatus of claim 14, wherein the storage means is further for storing one sample of the output audio data for each stored sample of the input audio data.

* * * * *